(12) United States Patent
Mihcak et al.

(10) Patent No.: US 7,664,266 B2
(45) Date of Patent: Feb. 16, 2010

(54) COMPRESSION OF FIBER-BASED CERTIFICATE OF AUTHENTICITY DATA

(75) Inventors: Mehmet Kivanc Mihcak, Redmond, WA (US); Yuqun Chen, Bellevue, WA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 904 days.

(21) Appl. No.: 11/140,580

(22) Filed: May 27, 2005

(65) Prior Publication Data

US 2006/0269062 A1 Nov. 30, 2006

(51) Int. Cl.
*H04K 1/00* (2006.01)
(52) U.S. Cl. ...................................... 380/255
(58) Field of Classification Search .................. 380/255
See application file for complete search history.

(56) References Cited

U.S. PATENT DOCUMENTS 7,356,148 B2 * 4/2008 Hayashi ...................... 380/281

2004/0153674 A1 * 8/2004 Hayashi ...................... 713/202

OTHER PUBLICATIONS

Rivest et al.; "A Method for Obtaining Digital Signatures and Public-Key Cryptosystems"; Communications of the ACM; Feb. 1978; vol. 21 No. 2; pp. 120-126.
Rissanen; "Modeling by Shortest Data Description"; Automatica, vol. 14, pp. 465-471; International Federation of Automatic Control Pergamon Press Ltd. 1978.
Kirovski; "Toward An Automated Verification of Certificates of Authenticity"; EC'04, May 17-20, 2004, New York, New York; ACM. pp. 160-169.

* cited by examiner

*Primary Examiner*—Jacob Lipman
(74) *Attorney, Agent, or Firm*—Lee & Hayes, PLLC

(57) ABSTRACT

Systems and methods for compressing data, particularly for use in manufacturing and verifying certificates of authenticity (COA), are described herein. Data elements obtained from a COA are ordered based on an iterative selection process. First, one or more data ranges are defined. Having defined the ranges, a data element from within each of the ranges is selected. The selected data elements are then encoded. The encoding of each data element is based on a position of that data element within a range from which the data element was selected.

20 Claims, 7 Drawing Sheets

COMPRESSION OF FIBER-BASED CERTIFICATE OF AUTHENTICITY DATA

TECHNICAL FIELD

The present disclosure generally relates to data compression, and more specifically to compression of data associated with a certificate of authenticity protecting a product.

BACKGROUND

A certificate of authenticity (COA) is a label, marking or a digitally signed physical object that gives the consumer assurance that a product is genuine, and is not a pirated copy or shoddily made fake. Preferably, a COA has a random unique structure that satisfies three requirements. First, the cost of creating and signing an original COA should be small, relative to a desired level of security. That is, the cost to the genuine manufacturer of the product should be small compared to the cost or retail price of the product. Secondly, the cost of manufacturing a COA instance should be several orders of magnitude lower than the cost of exact or near-exact replication of the unique and random physical structure of this instance. That is, while the COA is inexpensive for the legitimate manufacturer to create, it is expensive for the pirate manufacturer to replicate. And thirdly, the cost of verifying the authenticity of a signed COA is small, again relative to a desired level of security. The desired level of security should be typically closely tied to the cost of the product to which the COA is attached.

The uniqueness of each COA instance is a crucial element in fighting counterfeiting. Any single, unvarying feature can easily be mass-produced by a specialized machine whose construction cost is amortized over millions of counterfeit copies it produces. As an example, counterfeiters have been economically successful in forging en masse anti-counterfeiting holographic features, regardless of their sophistication.

Accordingly, a need exists for a new and improved certificate of authenticity.

SUMMARY

Systems and methods for compressing data, particularly for use in manufacturing and verifying certificates of authenticity (COA), are described herein. Data elements obtained from a COA are ordered based on an iterative selection process. First, one or more data ranges are defined. Having defined the ranges, a data element from within each of the ranges is selected. The selected data elements are then encoded. The encoding of each data element is based on a position of that data element within a range from which the data element was selected.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
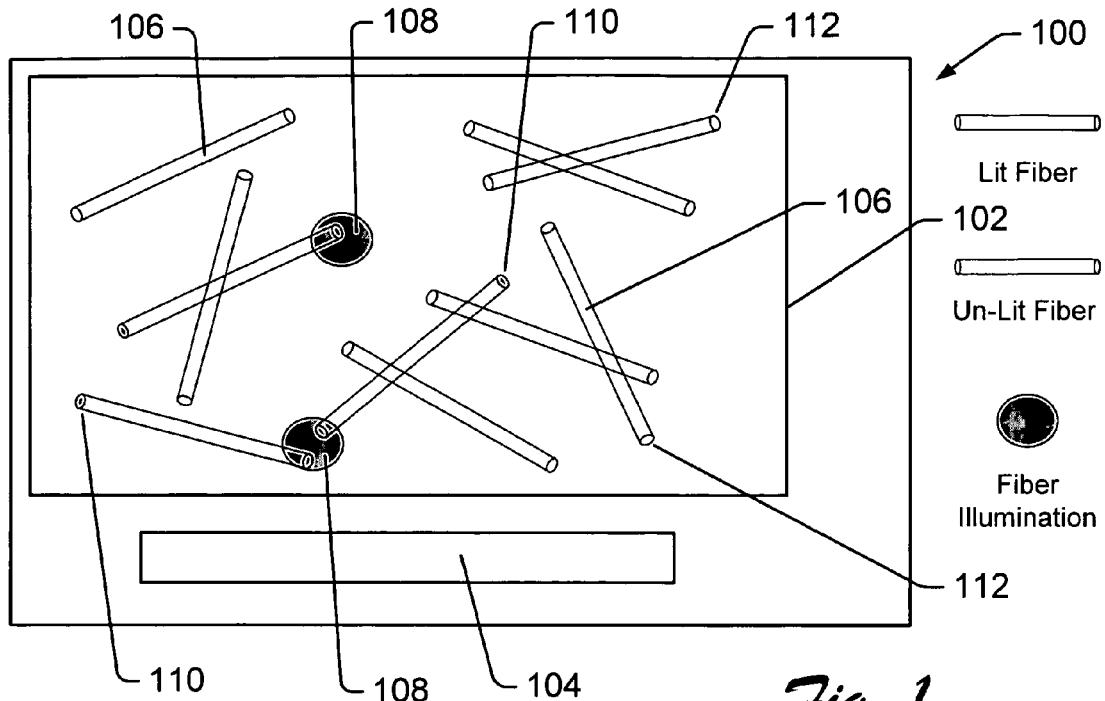
FIG. 1 illustrates an exemplary certificate of authenticity.

FIG. 1 shows an example of certificate of authenticity 100 (COA). The COA includes a region 102 containing randomly-placed, fixed-length optical fibers and an encoded message 104, which may be based on known technologies, such as barcode or RFID (radio frequency identification). In a typical embodiment, the optical fiber region 102 is created as a collection of optical fibers 106 randomly positioned in an object using a transparent gluing material that permanently fixes optical fibers' positions. Within the optical fiber region 102 seen in FIG. 1, three fibers 106 are illuminated by two regions 108 of illumination. When a first end of an optical fiber is illuminated, due to its location within the region 108 of illumination, the second end 110 of the optical fiber is also illuminated. In contrast, fibers having no ends within the regions 108 of illumination have non-illuminated ends 112. Accordingly, the optical fiber region 102 is characterized by randomly placed optical fibers 106 and regions 108 of illumination. Where one end of an optical fiber is within a region of illumination, the other end 110 will also be illuminated. In contrast, optical fibers not having ends within the region of illumination will have darkened ends 112.

Thus, FIG. 1 illustrates that a key to counterfeit deterrence provided by a fiber-based COA is based on the fact that a strand of optical fiber conducts light between two distinct points. A collection of optical fibers may be described using a dimensionality that is higher than that of a conventional two-dimensional image. In the most general case wherein the fibers are of an arbitrary length, a four-dimensional system results, since four coordinate numbers are needed to describe each fiber. In particular, two coordinates are needed for the x and y coordinates of each end of the optical fiber. In typical applications wherein the length of the optical fibers is fixed, or allowed to vary within a small range, the dimensionality is still equal to or greater than three. The three-plus dimensionality, coupled with the uniqueness of each randomly-generated fiber pattern, makes the proposed COAs drastically different from the conventional anti-counterfeiting features. Such conventional anti-counterfeiting COAs are either two-dimensional, or unvarying, or both in nature. Two-dimensional features are easily copied by the use of printers or special press-molding devices.

Figure 2:
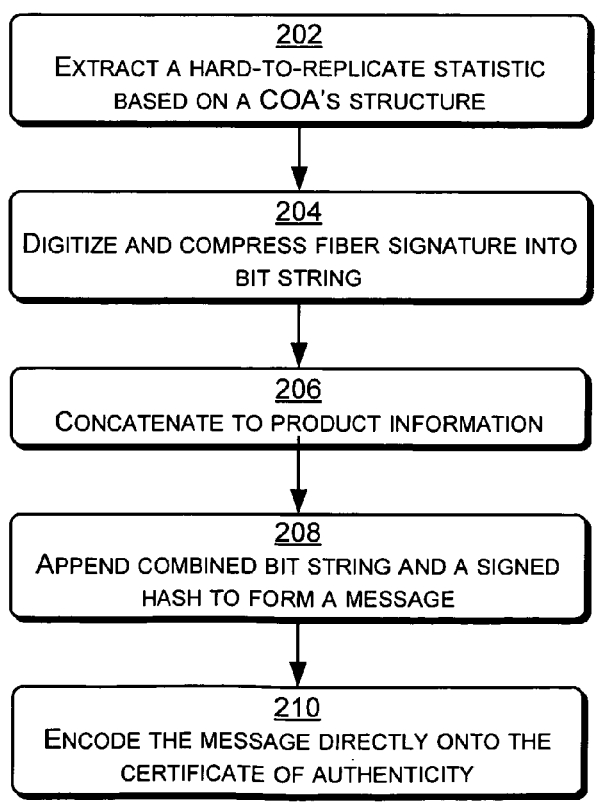
FIG. 2 illustrates an example of a method whereby a certificate of authenticity is created.
Figure 5:
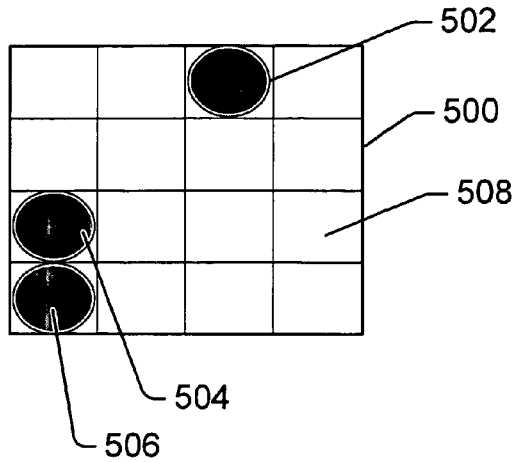
FIG. 5 illustrates an example of a grid, which when applied to optical fibers within a certificate of authenticity, facilitates association of points of light with data to be compressed.

FIG. 2 illustrates an exemplary method 200 whereby a certificate of authenticity is created. At block 202, a hard-toreplicate statistic based on a COA's unique structure is extracted. In a typical implementation, a scanner is used to extract a statistic related to positions of optical fibers within the COA. Note that the positions of the illuminated fiber ends detected by the scanner can be a function of the shape and location of the fibers as well as the location of the illuminated regions 108. At block 204, this unique "fiber signature" of a COA instance is then digitized and compressed into a bit string f. Note that digitalization may be performed using a grid, such as seen in FIG. 5. Compression strategies are discussed with respect to FIGS. 6-9. At block 206, string f is concatenated to a string g containing product information. The product information may be related to the product to which the COA is affixed. More specifically, the product information may include data such as product ID and expiration date. The concatenation forms a combined bit string w=f∥g. At block 208, the combined bit string w along with a signed hash of the combined bit string w is then appended to form a message m=w∥S(H(w)). The hash function H is a cryptographically strong algorithm such as SHA1 (Secure Hash Algorithm). In order to guard against the possibility that a device used to verify authenticity of the COA may fall into the hands of the adversary, the signing function S is based on public-key cryptography. Accordingly, the issuer signs H(w) with a private key and the verifier validates the integrity of m using the public key. At block 210, the message m is encoded directly on the COA using such existing technology as 2D barcode or RFID (radio frequency identification). For example, the message m can be encoded in the barcode 104 of FIG. 1.

Figure 3:
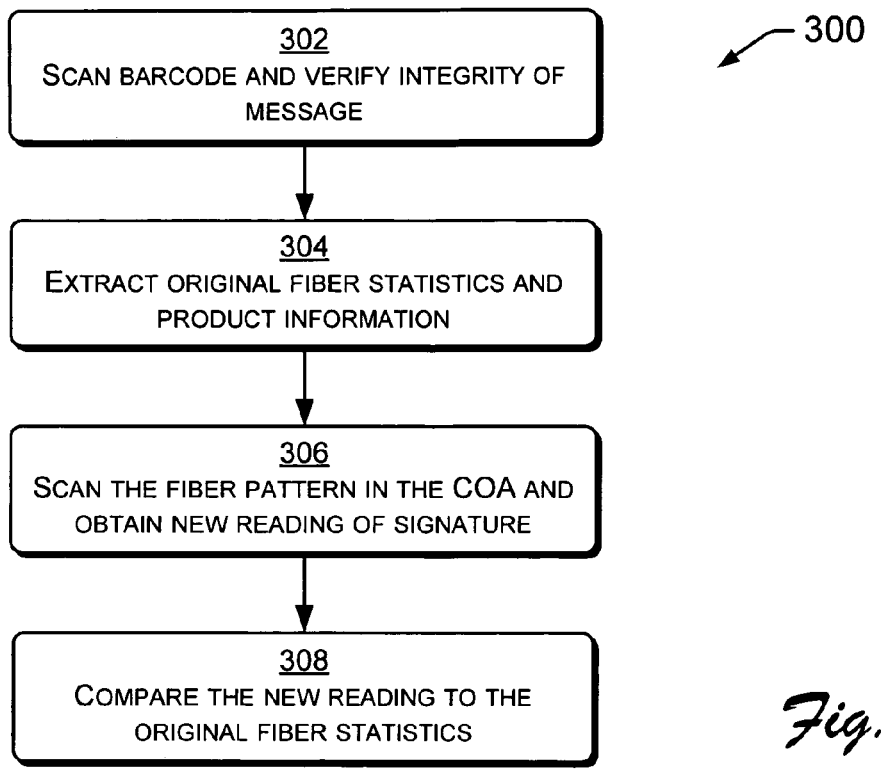
FIG. 3 illustrates an example of a method whereby a certificate of authenticity is verified.

FIG. 3 illustrates an exemplary method 300 whereby a certificate of authenticity is verified. At block 302, the barcode is scanned (or, in an alternative embodiment, an attached RFID is read). Scanning or reading information included within the COA allows retrieval of the string m=w∥S(H(w)). Once obtained, the integrity of the string w may be verified using the public key and S(H(w)). At block 304, having verified the integrity of w, the original fiber statistics f and the product information g are extracted from w. At block 306, the fiber pattern in the COA is scanned, thereby obtaining a new reading, f', of the fiber signature. At block 308, the new reading, f', and the old value f, are compared. If the level of similarity between f and f' exceeds a pre-defined threshold, the verifier declares the COA instance to be authentic. Where this is not the case, the COA is deemed counterfeit.

Note that the extraction of fiber statistics f from the scanned barcode (e.g. block 304 of FIG. 3) involves the usage of the de-compression algorithm. In order to counterfeit protected objects, an adversary needs to perfect any of three possible attack strategies. In a first strategy, the adversary could compute the private key of the COA issuer. Computation of the private key would allow the adversary to create COAs having random optical fiber patterns, and then sign those fiber patterns. This attack strategy can be made arbitrarily difficult by adjusting the length of the key used. Accordingly, this strategy is not attractive to a pirate manufacturer.

In a second strategy, the adversary could devise a manufacturing process that can exactly replicate an already signed COA instance. Referring back to FIG. 1, the second strategy would involve replicating both the region 102 of randomly-placed optical fibers and the encoded message 104. This task is not insurmountable, but does result in very significant expenses by the malicious party. Accordingly, it can be seen that the forging cost of the region 102 and message 104 imply the value that a single COA instance can protect. That is, a COA can be used to protect objects whose value roughly does not exceed the cost of forging a single COA instance including the accumulated development of a successful adversarial manufacturing process.

In a third strategy, the adversary misappropriates (i.e. steals) signed COA instances. Of course, the organization that issues COA instances must be responsible for such misappropriations, and take appropriate steps to prevent this occurrence.

Figure 4:
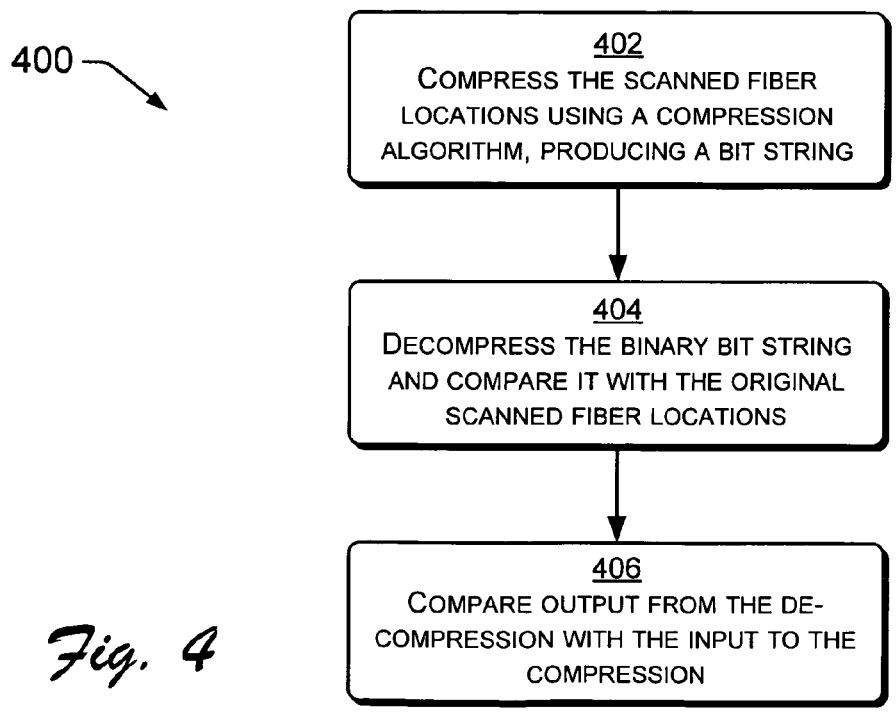
FIG. 4 illustrates an example of a method whereby a compression algorithm used within a certificate of authenticity is verified.

FIG. 4 illustrates an exemplary method 400 whereby a compression algorithm used within a certificate of authenticity is verified. At block 402, the scanned fiber locations are compressed using a given compression algorithm. As a result of the compression, a binary bit string is produced. Referring briefly to FIG. 1, the scanned fiber locations are obtained by scanning the optical fiber region 102 after illuminating one or more regions 108, thereby causing illuminated ends 110 in some of the fibers and non-illuminated ends in others of the fibers. These differences in illumination are detected by the scan. Thus, at block 402, fiber location data from the scan are compressed and the binary bit sting is produced.

At block 404, the binary bit string (produced at the end of block 402) is decompressed and compared with the original scanned fiber locations.

At block 406, if the de-compression engine output (produced at block 404) and the compression engine input (input to block 402) are the same, then the compression engine is fully functional for that particular input. Accordingly, the binary string produced at block 402 is output as the compression engine result.

Lossless Compression

A lossless compression algorithm is adapted for use in compressing COA fiber location data, as well as for generic lossless compression applications. In a COA application, it is important to create a binary representation for an ensemble of distinct points with minimum number of bits possible. From a practical perspective, this is because the message region 104 (FIG. 1) may be a barcode or other device not having extensive capacity. In a COA application, the order of the points is not important, and bits (i.e. data space within the region 104 of FIG. 1) should not be expended in trying to order the points in any particular manner. However, in the COA application each point is a member of high dimensional finite integer grid. Therefore, the problem can be viewed as the "lossless compression" of a set of distinct points resulting from a scan of the fiber optics. In a COA application, it is assumed that the dimension of each point and the cardinality of the input set of points are fixed and known at both encoder and decoder. Furthermore, it is assumed that the given set of points is uniformly and randomly selected among all possible such sets. These concepts are more conveniently discussed if a consistent notation is used.

Accordingly, the following notation will be used throughout this disclosure. We are given a set P of M distinct points in the N-dimensional finite integer grid: $P \triangleq \{p_1, p_2, \ldots, p_M\}$, where $p_i \in U \triangleq \{1, 2, \ldots L\}^N$, $p_i \neq p_j$ for $i \neq j$ and $1 \leq i \leq M$. In the COA implementation, the set P is derived from scanning a fiber optics-based COA. However, the set P could be based on other data requiring compression. Furthermore, P is a uniformly-randomly-chosen, cardinality-M subset from the universal set Upper our assumptions. We would like to describe P by a binary bit string (as short as possible); such a compression algorithm can also be thought of as an "enumeration technique" to efficiently label all possible cardinality-M subsets of U. Let R be the total number of bits spent for compression.

A straightforward approach would be to use $\lceil \log_2 L \rceil$ bits in order to encode each coordinate of each point, where $\lceil \cdot \rceil$ denotes rounding to the nearest larger integer operator. This means encoding each point by $N\lceil \log_2 L \rceil$ bits, which results in $R=MN\lceil \log_2 L \rceil$ bits to describe any set P. On the other hand, noting that there are a total of $$\binom{L^N}{M}$$

cardinality-M equally-likely subsets of U, we observe the following standard information-theoretic entropy bound that holds for any compression algorithm:

$$R \geq \log_2 \binom{L^N}{M} \qquad (1)$$

where we relied on the uniform distribution of P from all cardinality-M subsets of U. Here the right hand side of (4.1) is the entropy of the underlying distribution. Note that the entropy bound is maximized by uniform distribution in discrete finite sets (which is the case for our problem). Naturally, the bound would yield different values (to be more precise strictly less than $$\binom{L^N}{M})$$

in case of non-uniform distributions (i.e., the cases where distinct points are not uniformly randomly scattered in the space).

Lemma 1: The straightforward algorithm introduces a redundancy of at least log M! bits with respect to the entropy bound:

$$MN\lceil \log_2 L \rceil - \log_2 \binom{L^N}{M} > \log_2 M!$$

Furthermore, the bound is asymptotically tight as $L^N/M \to \infty$.

Proof:

$$MN\lceil \log_2 L \rceil - \log_2 \binom{L^N}{M} \geq \log_2 \frac{L^{MN}}{\binom{L^N}{M}} >$$

$$\log_2 \left[ L^N(L^N-1) \cdots (L^N-M+1) \bigg/ \binom{L^N}{M} \right] = \log_2 M!$$

The second part of the lemma follows from using $$\lim_{L^N/M \to \infty} L^{MN} - L^N(L^N-1) \cdots (L^N-M+1) = 0.$$

An embodiment of a compression algorithm is motivated by Lemma 1, and provides much better performance than the straightforward method. It can be shown experimentally that the embodiment has a redundancy (i.e., the gap between the algorithm performance and the entropy bound) that is small enough for most practical purposes. For convenience, the remainder of this disclosure will refer to the straightforward approach as the case of "no compression."

Compression Algorithm

As a first step, it can be shown that another problem in one dimension is equivalent to our original problem of lossless compression in high dimensions. For any point $p \in U$, let $p(k)$ denote its k-th component, $1 \leq k \leq N$. Note that, for all k, $p(k) \in \{1, 2, \ldots L\}$. Now define the mapping $M(\cdot): U \to V$ such that $$c = M(P) \triangleq 1 + \sum_{k=1}^{N} [L^{k-1}[p(k)-1]], \qquad (2)$$

where it can easily be verified that $V=\{1, 2, \ldots L^N\}$. Furthermore, it can be shown that M is a one-to-one mapping. In fact, given $c=M(p)$, p can be iteratively computed by first noting $$p(1)=1+\{(c-1) \bmod L\}, \qquad (3)$$

and for all $1 < k \leq N$, given $\{p(l)\}_{l=1}^{k-1}$ via calculating $$p(k) = 1 + \left\{ \left[ c - 1 - \sum_{l=1}^{k-1} [p(l)-1]L^{l-1} \right] \bmod L^k \right\} \bigg/ L^{k-1}. \qquad (4)$$

Recall that, per problem construction, there is a uniform probability distribution on P among all possible cardinality-M subsets of U; this implies that there is also a uniform probability distribution on M(P) among all possible cardinality-M subsets of M(U) since M is a one-to-one mapping. In this section, the latter problem is considered, and a method is disclosed to compress uniformly randomly-distributed cardinality-M subsets of $M(U)=\{1, 2, \ldots L^N\}$. In practice, at the encoder side, scattered N-dimensional points from U can be mapped to one-dimensional points via equation (2) prior to using the encoding algorithm; at the decoder side, after applying the de-compression algorithm, one-dimensional points from M(U) can be re-mapped back to N-dimensional space via (see equations (3) and (4)).

An assumption may be made that for any set $P=\{p_1, p_2, \ldots, p_M\} \subset \{1, 2, \ldots, L^N\}$, we are given $M(P)=\{c_1, c_2, \ldots, c_M\} \subset \{1, 2, \ldots, L^N\}$, where $c_i \triangleq M(p_i)$, $1 \leq i \leq M$. Furthermore, since the order is unimportant, we assume that the input points $\{c_i\}$ are given in ascending order without loss of generality: $c_1 < c_2 < \ldots < c_M$. In one embodiment, the first step is to form a tree from these points. The basic idea is to use an iterative process to decrease the range (i.e., the difference between the known minimum upper and maximum lower bounds) bounding each point as the depth of the tree increases in a balanced fashion. The next step is to encode these points using the formed tree, thereby encoding the points in an order that saves bits. Bits are saved because successively encoded points are associated with smaller and smaller ranges (since the binary tree successively bifurcated the ranges from which a median point was selected), and the encoding of each point is expressed as a distance from that point to a bound of the range.

Data Ordering and Tree Formation

In one implementation, the basic idea is to choose the order of encoding the points such that the previously encoded points can "help" the encoding of the current point as much as possible. We assume that the number of bits spent to encode each point is equal to the (base 2) logarithm of the difference between the known minimum lower bound and the known maximum upper bound. Thus, previously encoded points help in encoding the current point by decreasing this gap (i.e., by either decreasing the known minimum upper bound or increasing the known maximum lower bound). As it turns out, gains are achieved in compression by selecting the order of encoding carefully. This basic idea is illustrated in the following very simple example.

A simple example is instructive of these concepts. FIG. 5 illustrates an example of a grid 500, which when applied to optical fibers within a certificate of authenticity, facilitates association of points of light with data to be compressed. In particular, lighted locations 502, 504, 506 are found in locations 3, 9 and 13, respectively. These locations represent the lit ends of optical fibers that have their other end in an illuminated location. Other locations 508 are not illuminated. Accordingly, M=3, L=4, N=2 and $c_1$=3, $c_2$=9, $c_3$=13. Prior to encoding, all that is known is that 0<$c_1$<$c_2$<$c_3$<17. In the first try, suppose the encoding is done in the given ascending order of ($c_1$, $c_2$, $c_3$). In encoding $c_1$, we know 0<$c_1$<17 and spend $\lceil \log(17-0-1) \rceil$=4 bits. Next, in encoding $c_2$, we know $c_1$=3<c2<17 and thus spend $\lceil \log(17-3-1) \rceil$=4 bits. Finally, in encoding $c_3$, we know $c_2$=9<$c_3$<17 and spend $\lceil \log(17-9-1) \rceil$=3 bits. This results in spending 4+4+3=11 bits in total. Note that in encoding each symbol, we check the "range" of that symbol by using the previously encoded symbols. Obviously, fewer bits would be spent if the average range of each symbol can be squeezed (i.e. shortened) by choosing a more clever encoding order.

In a somewhat changed example, suppose the bits are encoded in the order of ($c_2$, $c_1$, $c_3$), and that order is known at the decoder. In encoding $c_2$, we spend 4 bits. For the next symbol $c_1$, we know that 0<$c_1$<$c_2$=9, which means spending $\lceil \log(9-0-1) \rceil$=3 bits. Similarly for $c_3$, we know that $c_2$=9<$c_3$<17, which means spending $\lceil \log(17-9-1) \rceil$=3 bits; overall we spend 4+3+3=10 bits in total, which is one bit less than the bit rate of the previous method, where we chose the symbols in the ascending order. This is because we had a better partitioning of the interval {1, 2, . . . 16} in the second method; on average, we decreased the ranges of the second and third symbols after encoding the first symbol, because the first symbol was selected as the median of the three.

Accordingly, an embodiment of the compression algorithm uses a particular encoding order, where at each step we encode the median symbols within a given range. The rationale is to minimize the range of the future symbols to be encoded as much as possible. As it turns out such an encoding order can be represented by a binary tree (i.e., a tree where each parent can have at most 2 children). Next, a tree formation algorithm is disclosed, which readily gives the encoding order; furthermore, since this algorithm is known at the receiver, the decoder also knows this order, thereby providing synchronization between encoder and decoder.

Figure 6:
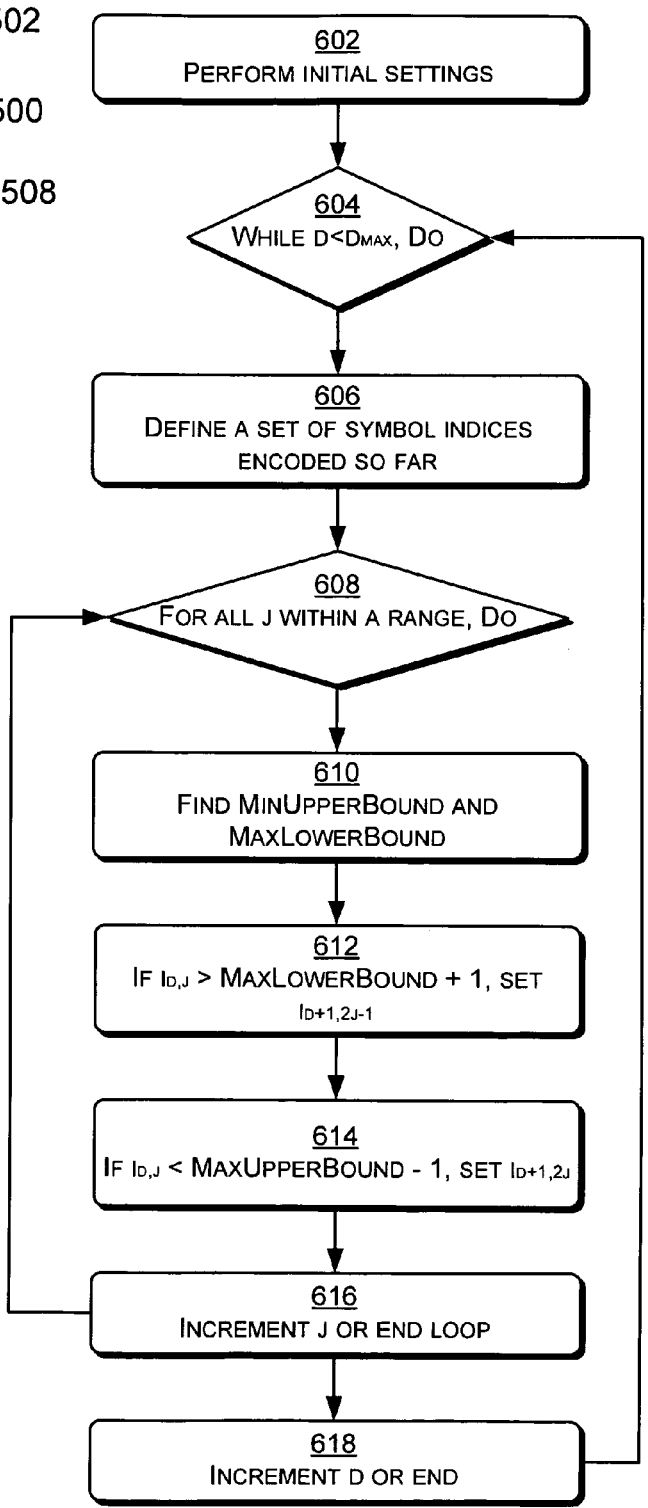
FIG. 6 illustrates an example wherein a binary tree structure is used to organize data obtained by observing points of light associated with the fiber optics of a certificate of authenticity, wherein use of the binary tree changes the order of the data for more efficient compression.

FIG. 6 illustrates an exemplary method 600 using a binary tree structure to organize data obtained by observing points of light associated with the fiber optics of a certificate of authenticity, wherein use of the binary tree changes the order of the data for more efficient compression. Let $i_{d,j}$ denote the index of the j-th symbol at depth d of the binary tree. Here, d≧1; and at a given depth d, we have $1 \leq j \leq 2^{d-1}$. Note that for all d, j, $i_{d,j} \in \{1,2, \ldots M\}$ and $M \leq 2^0 + 2^1 + \ldots + 2^{d_{max}-1} = 2^{d_{max}}-1$ where $d_{max}$ is the maximum depth of the binary tree. We form the tree using the following algorithm.

At block 602, variables are established and initialized according to the above indicated notation, such that $i_{1,1} = \lceil M/2 \rceil$, d=1, and $d_{max} = \lceil \log(M+1) \rceil$.

At block 604, a loop, such as a "while" or "do" loop is entered. More particularly, the loop is performed "While d<$d_{max}$ do:" wherein d is incremented at block 618.

At block 606, the definition of $S_d$ is refined by adding to the set of encoded symbols in an iterative manner. In a more specific example, we define $S_d = \{i_{l,j} | 1 \leq l \leq d, 1 \leq j \leq 2^{d-1}\} \cup \{0, M+1\}$ as the set of encoded symbol indices so far.

At block 608, another loop, such as a "while" or "do" loop, is entered. In a more specific example, the loop is performed "for all $1 \leq j \leq 2^{d-1}$ do," wherein j is incremented at block 616.

At block 610, values for the variables MinUpperBound and the MaxLowerBound are found. For example, these bounds may be found according to: MinUpperBound=arg $\min_{l \in S_d, l > i_{d,j}} |l - i_{d,j}|$ and MaxLowerBound=arg $\max_{l \in S_d, l < i_{d,j}} |l - i_{d,j}|$.

At block 612, a check is made to determine if a value should be inserted into a particular tree location. In a more specific example, if $i_{d,j}$>(MaxLowerBound+1), set $i_{d+1,2j-1}$|(MaxLowerBound+$i_{d,j}$)/2|; else, leave $i_{d+1,2j-1}$ blank or empty.

At block 614, a second check is made to determine if a value should be inserted into a further tree location. In a more specific example, if $i_{d,j}$<(MinUpperBound-1), set $i_{d+1,2j}$=|(MinUpperBound+$i_{d,j}$)/2|; else, leave $i_{d+1,2j}$ blank or empty.

At block 616, j is incremented, allowing return to block 608, where j is still within the range. If not, at block 618 d is incremented, allowing return to block 604 if d is less than $d_{max}$. If not, the binary tree is completed, meaning that data elements have been located within the tree in an order that is helpful during the compression algorithm.

Figure 7:
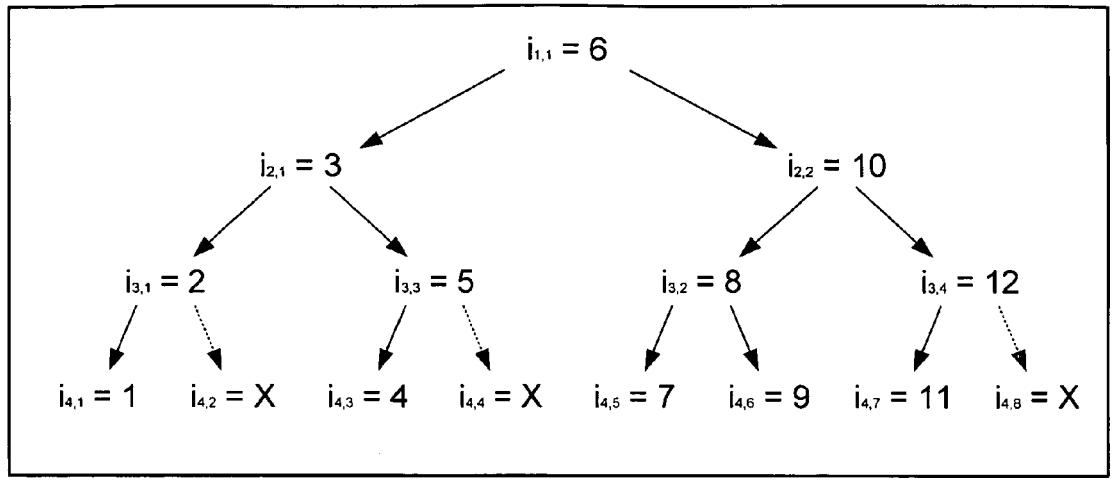
FIGS. 7 and 8 illustrate examples of binary trees containing data ready for encoding.
Figure 8:
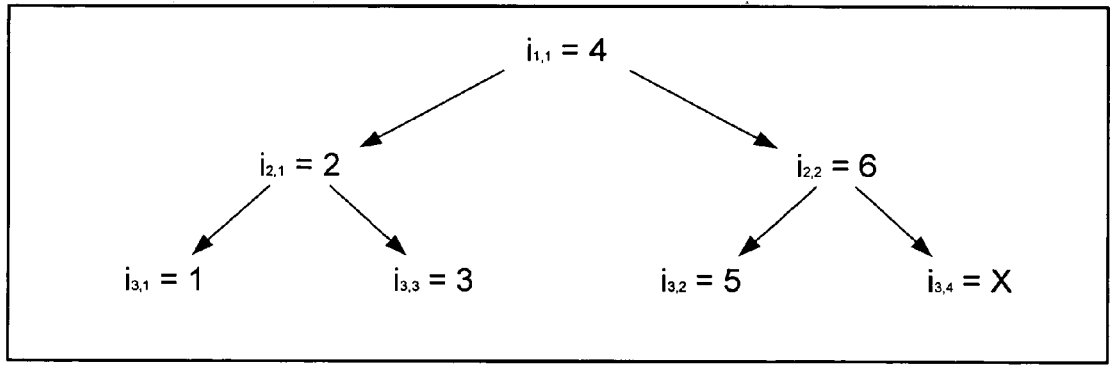

FIGS. 7 and 8 show two example tree structures produced by the algorithm above, for the cases of M=12 and M=6 respectively. Note that in several locations the tree of FIG. 7 is empty (i.e. several tree locations show an "X"). This reflects only the fact that more data locations were available than data elements.

Encoding Data

This section describes an encoding process, wherein values are assigned to the individual elements of a given set {$c_1$, $c_2$, . . . $c_M$}, thereby producing a binary codeword for the whole set M(P). In the bit assignment, the order by which the symbols are encoded is significant, and may be obtained from a binary tree (e.g. FIGS. 7 and 8) according to the method 600 of FIG. 6. Thus, the tree structure, derived by the algorithm presented in FIG. 6, uniquely represents the encoding (and naturally the decoding) order. Within the tree, encoding is done level-by-level in an increasing order and for each level of the tree from left to right. For instance, using FIG. 7, one can easily see that if M=12 (regardless of the symbol values), the order of the symbols to be encoded is $c_6$, $c_3$, $c_{10}$, $c_2$, $c_5$, $c_8$, $c_{12}$, $c_1$, $c_4$, $c_7$, $c_9$, $c_{11}$. Below, a formal description of one embodiment of the encoding algorithm is given according to a tree structure, namely the entries of the tree {$i_{d,j}$}.

Figure 9:
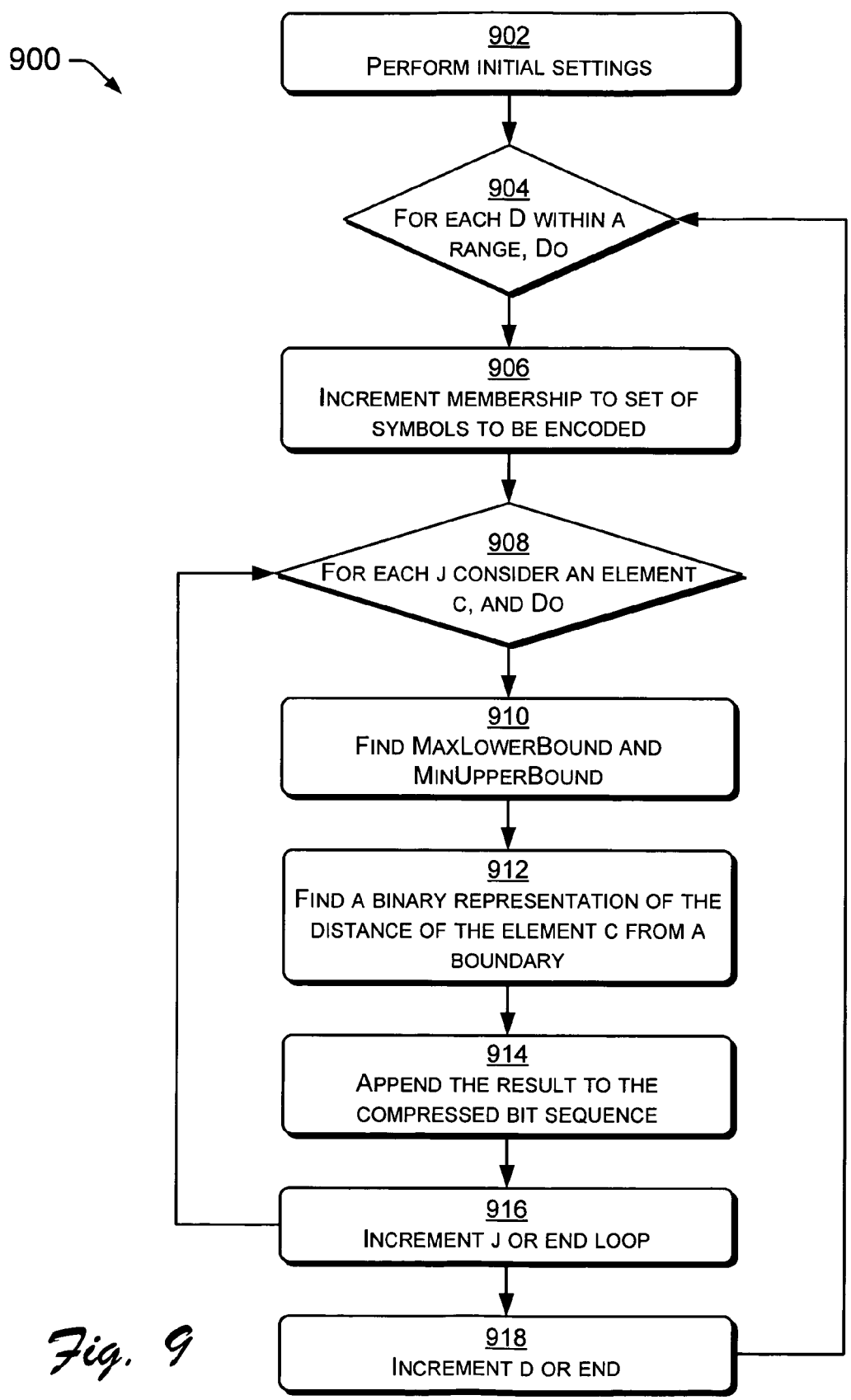
FIG. 9 illustrates an example method adapted to order data elements using the binary tree structure, wherein the new data order facilitates compression.

FIG. 9 illustrates an example method 900 adapted to order data elements using the binary tree structure, wherein the new data order facilitates compression. At block 902, variables are established and initialized according to the disclosed notation. In particular, set $c_0$=0 and $c_{M+1} = L^N + 1$. At block 904, a loop, such as a "while" or "do" loop is entered. More particularly, the loop is performed "For each $1 \leq d \leq d_{max}$ do," wherein d is incremented at block 918. At block 906, the membership to the set of symbols to be encoded is incremented. In particular, the set $S_d$ is defined $S_d = \{c_{i_{l,j}} | 1 \leq l \leq d\} \cup \{c_0, c_{M+1}\}$.

At block 908, a further loop, such as a "while" or "do" loop is entered. More particularly, the loop is performed for a given d, for each $1 \leq j \leq 2^{d-1}$, wherein j is incremented at block 916 Within the loop, consider $c_{i_{d,j}}$ as the current coefficient to be compressed.

At block 910, a value for the variable MaxLowerBound is found. In particular, $$MaxLowerBound = \arg\max_{c \in S_d, c < c_{i_{d,j}}} |c_{i_{d,j}} - c|.$$

At block 912, a value for the data point is found, based on the data point's distance from the MaxLowerBound. Alternatively, the value could be based on the point's distance from the MinUpperBound. The value is then expressed using a number of bits based on a distance between the MaxLowerBound and the MinUpperBound. Thus, the value for the data point is based on the data point's position within the range associated with the data point. Accordingly, as the tree is traversed, and the ranges become narrower, the number of bits required to express each data point is reduced. In particular, the binary (encoded or compressed) representation of $(c_{i_{d,j}} - $ MaxLowerbound$)$ is found, and is expressed using $\lceil \log_2 (MinUpperBound - MaxLowerBound) \rceil$ bits.

At block 914, the resulting bits are appended to the end of compressed bit sequence.

It is important to note that because the tree structure, from which $\{i_{d,j}\}$ are derived, is known at the encoder and decoder simultaneously, perfect synchronization is achieved between the two. Therefore, the decoder simply performs the operation by repeating the steps of the encoder, except that conversion from $c_{i_{d,j}}$ to binary bits at block 912 is replaced by the reverse operation. Thus, it is not necessary to specify a separate decoding algorithm.

It is also important to note that the complexity of the algorithm is linear in M (the number of symbols to be compressed). As it turns out, in practice, it is not necessary to find the MaxLowerBound and MinUpperBound values in tree formation or encoding, because the input symbols are already given in ascending order. Thus, the overall complexity is linear in the number of symbols and per symbol complexity is roughly about the complexity of conversion of a decimal number to binary bits for the encoder (and the complexity of conversion of binary bits to a decimal number for the decoder).

Exemplary Embodiments

Figure 10:
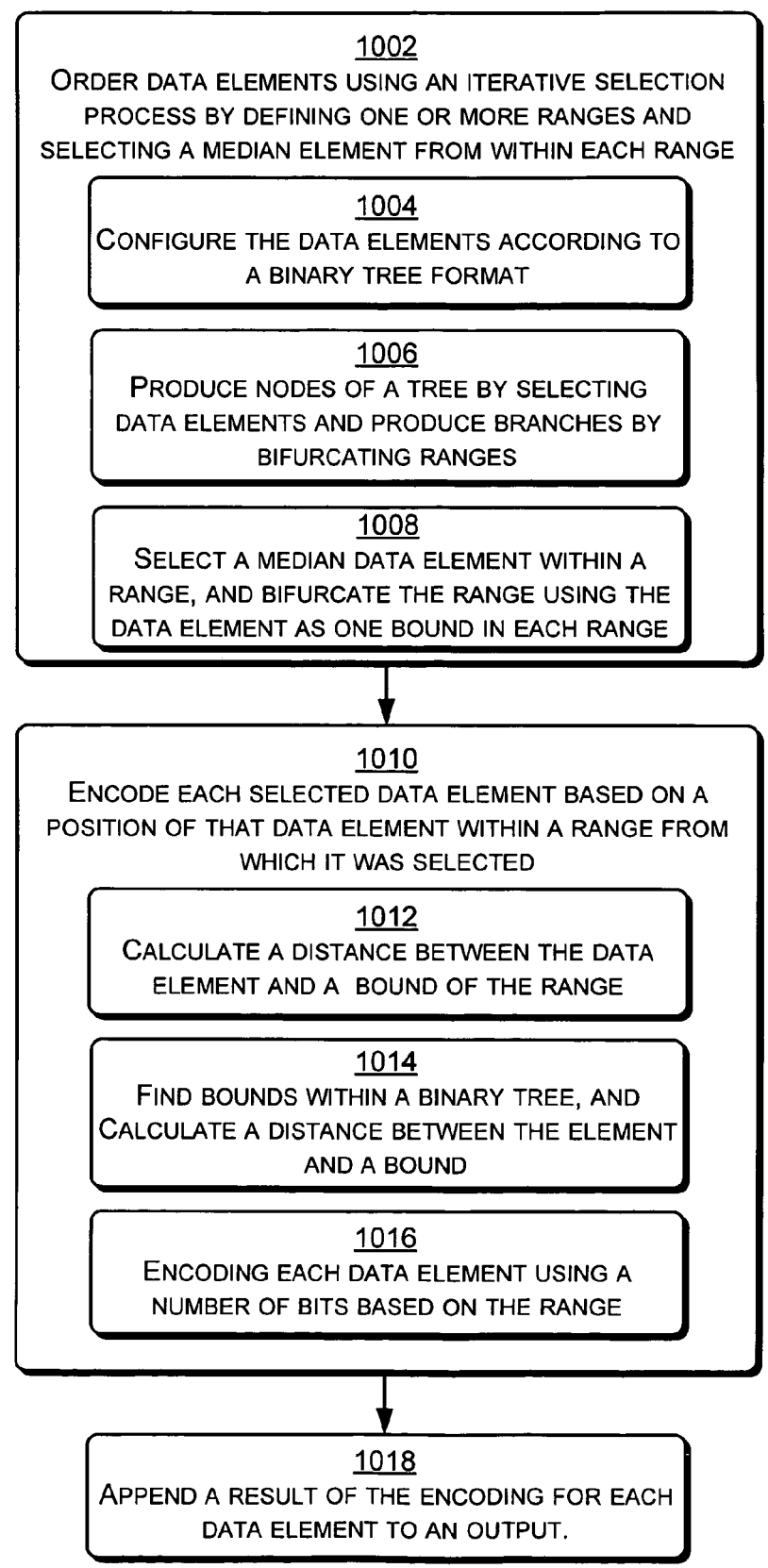
FIG. 10 illustrates an example method adapted for compression of fiber-based certificate of authenticity data.

FIG. 10 illustrates an example method 1000 adapted for compression of fiber-based certificate of authenticity data. At block 1002, data elements are ordered using an iterative selection process by defining one or more ranges and selecting a data element from within each range. For example, the data element selected may be the median data element. Aspects of this data element ordering have been discussed with respect to FIGS. 6-8. Blocks 1004-1008 are representative of implementations wherein data elements are ordered, and may be performed singly or in combination. In the implementation of block 1004, data elements are configured according to a binary tree format. In particular, the binary trees of FIGS. 7 and 8 and associated discussion illustrate aspects of this method of data element ordering. In the implementation of block 1006, nodes of a tree are produced by selecting data elements and branches of a tree are produced by bifurcating ranges. In the implementation of block 1008, a median data element is selected with a range, and the range is then bifurcated using the data element selected as an upper bound in the lower range, a lower bound in the upper range or both.

At block 1010, each selected data element is encoded based on a position of that data element within a range from which it was selected. Blocks 1012-1016 are representative of implementations wherein data element are encoded, and may be performed singly or in combination. In the implementation of block 1012, a distance is calculated between the data element and a bound of the range. For example, at block 912 of FIG. 9, the distance between the data element and the MaxLowerBound was calculated. At block 1014, bounds for a range within which the data element is located are found within a binary tree. Typically, the bounds for a range containing a node of the tree are the nodes below that node. If there are no nodes below the node, the node is a bound of the range bounding the node above it in the tree. Having found the bounds of the range, a distance between the element and one of the bounds (e.g. the lower bound) is calculated. At block 1016, each data element is encoded using a number of bits based on the range. For example, the bits in the range can be calculated according to $\lceil \log_2(MinUpperBound - MaxLowerBound) \rceil$.

At block 1018, a result of the encoding for each data element is appended to an output. This output can be encoded directly onto the certificate of authenticity (e.g. see block 210 of FIG. 2).

Exemplary Computer

Figure 11:
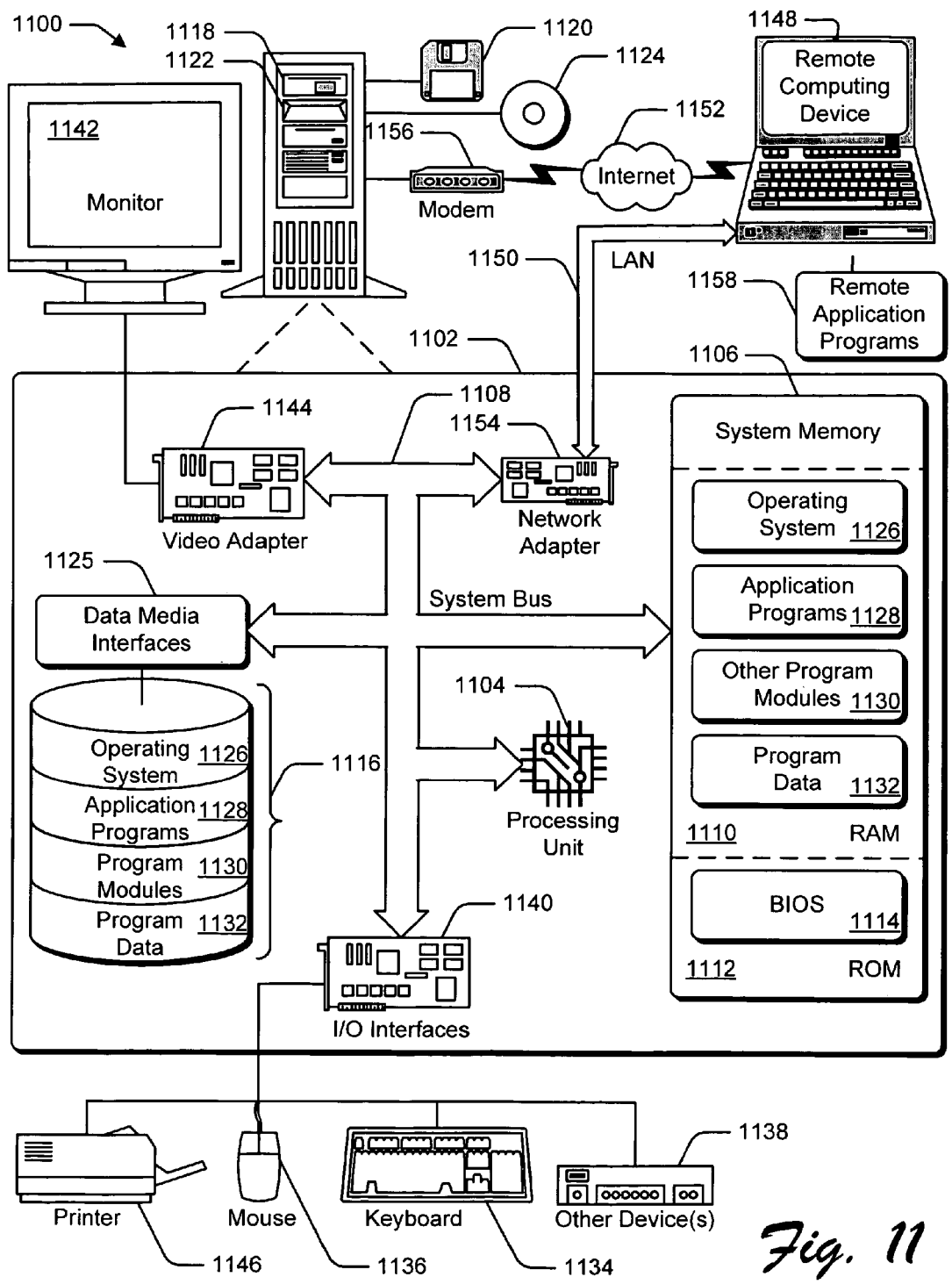
FIG. 11 illustrates an exemplary computing environment suitable for implementing compression of fiber-based certificate of authenticity data.

FIG. 11 illustrates an exemplary computing environment suitable for implementing data compression generally, and for implementing compression of data obtained from an optic fiber based COA in particular. Although one specific configuration is shown, variations could be resorted to, without departing from the teachings described herein.

The computing environment 1100 includes a general-purpose computing system in the form of a computer 1102. The components of computer 1102 can include, but are not limited to, one or more processors or processing units 1104, a system memory 1106, and a system bus 1108 that couples various system components including the processor 1104 to the system memory 1106. The system bus 1108 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 1102 typically includes a variety of computer readable media. Such media can be any available media that is accessible by computer 1102 and includes both volatile and non-volatile media, removable and non-removable media. The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 can also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1125. Alternatively, the hard disk drive 1116, magnetic disk drive 1118, and optical disk drive 1122 can be connected to the system bus 1108 by a SCSI interface (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1126, one or more application programs 1128, other program modules 1130, and program data 1132. Each of such operating system 1126, one or more application programs 1128, other program modules 1130, and program data 1132 (or some combination thereof) may include an embodiment of a caching scheme for user network access information.

Computer 1102 can include a variety of computer/processor readable media identified as communication media. Communication media typically embodies computer readable instructions, data structures, program modules, or other data in a computer readable media.

A user can enter commands and information into computer system 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing device 1148. By way of example, the remote computing device 1148 can be a personal computer, portable computer, a server, a router, a network computer, a peer device or other common network node, and the like. The remote computing device 1148 is illustrated as a portable computer that can include many or all of the elements and features described herein relative to computer system 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet. When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components, such as the operating system, are illustrated herein as discrete blocks, although it is recognized that such programs and components reside at various times in different storage components of the computer system 1102, and are executed by the data processor(s) of the computer.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

Exemplary methods for implementing aspects of compression of fiber-based certificate of authenticity data were described with primary reference to the flow diagrams of FIGS. 2-4, 6, 9 and 10. The methods apply generally to aspects discussed above with respect to FIGS. 1, 5, 7 and 8. The elements of the described methods may be performed by any appropriate means including, for example, hardware logic blocks on an ASIC or by the execution of processor-readable instructions defined on a processor-readable medium. A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

The invention claimed is:

1. One or more computer-readable storage media comprising computer-executable instructions for compressing data, the computer-executable instructions comprising instructions for:

ordering data elements based on an iterative selection process comprising defining one or more ranges and selecting a data element from within each of the defined ranges;

encoding each selected data element, wherein the encoding of each data element is based on a position of that data element within a range from which the data element was selected and wherein encoding each selected data element comprises instructions for calculating a distance between the data element and an upper or lower bound of the range; and appending a result of the encoding for each data element to an output.

2. The one or more computer-readable storage media of claim 1, wherein ordering the data elements comprises instructions for configuring the data elements as nodes within a binary tree.

3. The one or more computer-readable storage media of claim 1, wherein ordering the data elements comprises instructions for configuring the data elements according to a binary tree format, wherein selection of a median data element within a range produces a node within the tree, and wherein the range is bifurcated so that the selected data element is a maximum bound of a first range or a minimum bound of a second range or both.

4. The one or more computer-readable storage media of claim 1, wherein ordering the data elements comprises instructions for:

selecting a median data element within a range; and bifurcating the range to produce two new ranges, wherein each of the two new ranges is terminated at one end by the selected data element.

5. The one or more computer-readable storage media of claim 1, wherein encoding each selected data element comprises instructions for:

finding, within a binary tree created by the ordering, upper or lower bounds of the range from which the data element was selected; and calculating a distance between the data element and one of the upper and the lower bounds.

6. The one or more computer-readable storage media of claim 1, wherein encoding each selected data element comprises instructions for encoding each data element using a number of bits based on a distance by which upper and lower bounds of the range are separated.

7. A method of creating a certificate of authenticity, comprising:

obtaining data elements based on observation of illuminated fiber optics;

ordering the obtained data elements based on an iterative selection process comprising establishing one or more ranges, selecting a data element from within each range, and, while additional data elements remain available, bifurcating each range to establish more ranges;

encoding the ordered data elements based on each data element's position with respect to a boundary of a range from which that data element was selected, thereby producing an output, wherein encoding the data elements comprises encoding each data element using a number of bits based on a separation distance between upper and lower bounds of the range; and producing the certificate of authenticity using the fiber optics and the output.

8. The method of claim 7, wherein ordering the data elements comprises configuring the data elements according to a binary tree format, wherein selection of a median data element within a range produces a node within the tree, and wherein the range is bifurcated so that the selected data element is a maximum bound of a first range or a minimum bound of a second range or both.

9. The method of claim 7, wherein ordering the data elements comprises:

selecting a data element from within the range; and bifurcating the range at the selected data element.

10. The method of claim 7, wherein selecting the data element from within each range comprises selecting a median data element within the range; and wherein bifurcating each range to establish more ranges comprises dividing the range at the median point.

11. The method of claim 7, wherein encoding the data elements comprises calculating a distance between the data element and the upper or the lower bound of the range.

12. The method of claim 7, wherein encoding the data elements comprises:

finding, within a binary tree created by the ordering, upper or lower bounds of the range from which the data element was selected; and calculating a distance between the data element and one of the upper and the lower bounds.

13. A certificate of authenticity, comprising:

optical fibers having first and second ends, wherein illumination of a first end illuminates the second end; and encoded data elements obtained by illumination of at least some of the optical fibers and observation of illuminated second ends of the illuminated optical fibers;

wherein the encoded data elements are compressed by operation of a processor using processor-executable instructions, wherein the instructions:

order data elements based on an iterative selection process comprising defining one or more ranges and selecting a data element from within each of the defined ranges;

encode each selected data element, wherein the encoding of each selected data element is based on a position of that data element within a range from which the data element was selected, and wherein encoding each selected data element comprises instructions for encoding each data element using a number of bits based on a distance by which upper and lower bounds of the range are separated; and append a result of the encoding for each data element to an output.

14. The certificate of authenticity of claim 13, wherein ordering the data elements comprises configuring the data elements as nodes within a binary tree.

15. The certificate of authenticity of claim 13, wherein ordering the data elements comprises configuring the data elements according to a binary tree format, wherein selection of a median data element within a range produces a node within the tree, and wherein the range is bifurcated so that the selected data element is a maximum bound of a first range or a minimum bound of a second range or both.

16. The certificate of authenticity of claim 13, wherein ordering the data elements comprises instructions for:

selecting a median data element within a range; and bifurcating the range to produce two new ranges, wherein each of the two new ranges is terminated at one end by the selected data element.

17. The certificate of authenticity of claim 13, wherein encoding each selected data element comprises instructions for calculating a distance between the data element and the upper or lower bound of one of the one or more ranges.

18. The certificate of authenticity of claim 13, wherein the encoded data elements describe locations of end points lighted by the optical fibers upon illumination.

19. The certificate of authenticity of claim 13, wherein encoding each selected data element comprises instructions for calculating a distance between the data element and an upper or lower bound of a range.

20. The certificate of authenticity of claim 13, wherein encoding each selected data element comprises instructions for:

finding, within a binary tree created by the ordering, upper or lower bounds of a range from which the data element was selected; and calculating a distance between the data element and one of the upper and the lower bounds.

* * * * *